US008332760B2

(12) United States Patent
Keohane et al.

(10) Patent No.: US 8,332,760 B2
(45) Date of Patent: Dec. 11, 2012

(54) DYNAMICALLY MAPPING CHAT SESSION INVITATION HISTORY

(75) Inventors: Susann Keohane, Austin, TX (US);
Gerald F. McBrearty, Austin, TX (US);
Jessica Murillo, Round Rock, TX (US);
Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 11/334,673

(22) Filed: Jan. 18, 2006

(65) Prior Publication Data
US 2007/0168446 A1    Jul. 19, 2007

(51) Int. Cl.
G06F 3/00     (2006.01)
G06F 15/16    (2006.01)
G06F 9/00     (2006.01)

(52) U.S. Cl. ........ 715/752; 709/204; 715/716; 715/730; 715/734

(58) Field of Classification Search .................. 709/206, 709/204
See application file for complete search history.

(56) References Cited

U.S. PATENT DOCUMENTS

| | | | | |
|---|---|---|---|---|
| 5,627,979 | A * | 5/1997 | Chang et al. ................... | 715/763 |
| 6,499,053 | B1 | 12/2002 | Marquette et al. | |
| 7,124,164 | B1 * | 10/2006 | Chemtob ....................... | 709/204 |
| 7,356,567 | B2 * | 4/2008 | Odell et al. .................... | 709/206 |
| 2001/0006889 | A1 * | 7/2001 | Kraft .............................. | 455/412 |
| 2002/0055975 | A1 * | 5/2002 | Petrovykh ...................... | 709/205 |
| 2002/0163538 | A1 * | 11/2002 | Shteyn .......................... | 345/752 |
| 2003/0065721 | A1 * | 4/2003 | Roskind ......................... | 709/204 |
| 2005/0278425 | A1 * | 12/2005 | Wilsher et al. ................. | 709/204 |
| 2006/0063552 | A1 * | 3/2006 | Tillet et al. ..................... | 455/519 |
| 2006/0123117 | A1 * | 6/2006 | Heutchy et al. ............... | 709/227 |

FOREIGN PATENT DOCUMENTS

| | | |
|---|---|---|
| JP | 11-085781 A | 3/1999 |
| JP | 2000066970 A | 3/2000 |
| JP | 2001236292 A | 8/2001 |
| JP | 2003-256362 A | 9/2003 |
| JP | 2005-108123 A | 4/2005 |

OTHER PUBLICATIONS

U.S. Appl. No. 09/690,460, filed Oct. 19, 2000, Colson et al.
U.S. Appl. No. 10/202,961, filed Jul. 25, 2002, McGee et al.
U.S. Appl. No. 10/392,768, filed Mar. 19, 2003, Samn.
U.S. Appl. No. 11/014,068, filed Dec. 16, 2004, Keohane et al.
U.S. Appl. No. 11/006,125, filed Dec. 7, 2004, Keohane et al.
U.S. Appl. No. 11/006,392, filed Dec. 7, 2004, Keohane et al.
U.S. Appl. No. 11/095,739, filed Mar. 31, 2005, Murillo et al.
U.S. Appl. No. 11/226,958, filed Sep. 15, 2005, Keohane et al.

(Continued)

Primary Examiner — Asad Nawaz
Assistant Examiner — Jason Harley
(74) Attorney, Agent, or Firm — Matthew W. Baca; Amy J. Pattillo

(57) ABSTRACT

A method, system, and program are provided for dynamically mapping chat session invitation history. A chat controller for facilitating a chat session enables chat participants to invite additional users to join in the chat session. The chat controller dynamically generates a mapping of the chat participants to graphically represent a separate correspondence between each invited additional user and each inviting chat participant. The mapping is displayed within a user interface of a current participant or an invited additional user. Further, the displayed mapping is dynamically updated to reflect additional invitation history as the chat session continues.

18 Claims, 6 Drawing Sheets

OTHER PUBLICATIONS

Chiu et al, "Conferencing Metaphor", IBM Technical Disclosure Bulletin, copyright International Business Machines Corporation, Feb. 1993, pp. 63-66, available online from www.delphion.com.

"Sharing Existing Instant Messaging Information When Inviting Others to Join on Going Chat Session", 2 pages, copyright International Business Machines Corporation, published May 21, 2004, available online from ip.com, ip.com No. IPCOM000028572D as of May 21, 2004.

"Role Oriented Connections for Instant Messaging", 3 pages, IBM Technical Disclosure Bulletin, copyright International Business Machines Corporation, published May 16, 2002, available online from ip.com, ip.com No. IPCOM000015966D as of Jun. 21, 2003.

* cited by examiner

DYNAMICALLY MAPPING CHAT SESSION INVITATION HISTORY

BACKGROUND OF THE INVENTION

1. Technical Field

The present invention relates in general to improved chat messaging and in particular to dynamically mapping a chat session invitation history in a chat session where participants are enabled to invite additional participants, where the mapping graphically indicates the correspondence between each inviter and invitee to a chat session.

2. Description of the Related Art

Chat messaging continues to change the way people communicate. Within a business context, chat messaging provides a way for employees, vendors, clients, and partners to communicate instantly, often eliminating the inefficiency and cost of voice mail and long distance.

Many chat services provide for current chat participants to invite additional chat participants to enter a chat session. As new participants join a chat session, however, a new participant is at a disadvantage because the new participant cannot see previous chat entries in the chat session. Further, a new participant is at a disadvantage because even if a new participant is provided a listing of the other current participants, the new participant cannot see when the current participants joined the chat session, previous participants who have left the chat session, users who declined to join the chat session, and why each user was invited to join a chat session.

Therefore, in view of the foregoing, it would be advantageous to provide a method, system, and program for generating a dynamic graphic mapping of an ordering in which users join a chat session, of the correspondence between each inviter of and each invitee of the chat session, and why each user was invited joined the chat session and enabling both current participants and invitees to view the graphical mapping.

SUMMARY OF THE INVENTION

Therefore, the present invention provides improved chat messaging management. In one embodiment, a chat controller for facilitating a chat session enables chat participants to invite additional users to join in the chat session. The chat controller dynamically generates a mapping of the chat participants to graphically represent a separate correspondence between each invited additional user and each inviting chat participant.

In addition, the mapping may include other graphical representations of invitation history and information about the chat participants and invited additional users. The mapping graphically represents an ordering of invitation and response to the invitation of each of the chat participants and each invited additional user. In addition, the mapping graphically represents a separate reason for inviting each chat participant and invited additional user to join the chat session. Further, the mapping graphically represents a separate business hierarchy level for each chat participant and invited additional user in relation to the other chat participants and invited additional users. In addition, the mapping graphically represents a separate availability status to participate in chat messaging of each of the chat participants.

The mapping is displayed within a user interface of a current participant or an invited additional user. Further, the displayed mapping is dynamically updated to reflect additional invitation history as the chat session continues. Each separate generation of the mapping is logged in a displayable log file for the chat session.

Prior to displaying a mapping the graphical treatment of the mapping and information included in the mapping is adjusted according to a user preference for a user requesting the mapping, a chat service provider, or a user represented in the mapping. A user preference includes security preferences for restricting access to selected information generated in a mapping based on the receiving user.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
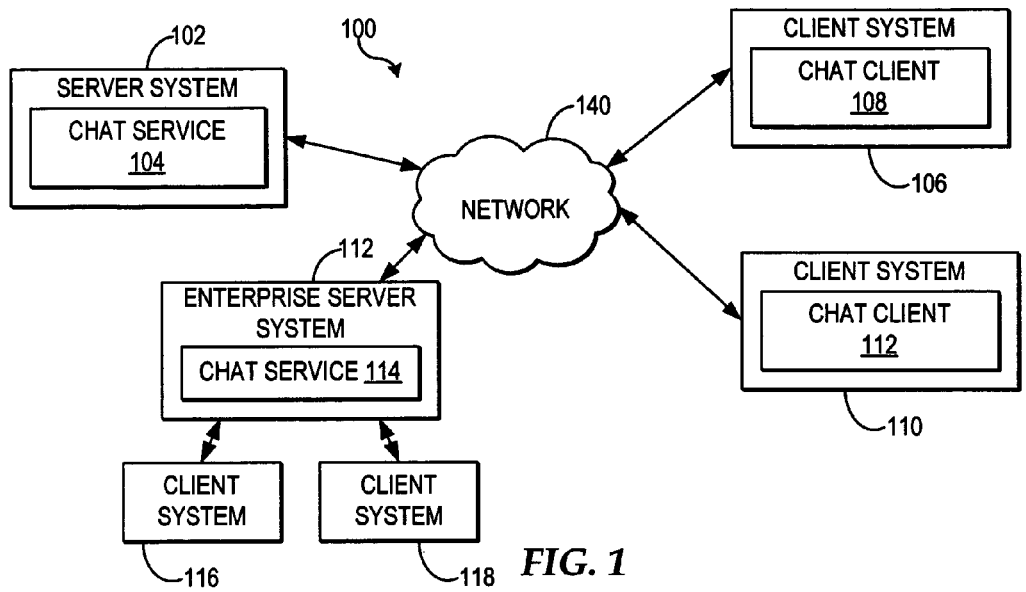
FIG. 1 is a block diagram depicting a chat messaging network environment.

With reference now to FIG. 1, a block diagram depicts a chat messaging network environment. As illustrated, multiple systems may be communicatively connected via network 140, which is the medium used to provide communications links between various devices and computer communicatively connected. Network 140 may include permanent connections such as wire or fiber optics cables and temporary connections made through telephone connections and wireless transmission connections, for example. Network 140 may represent both packet-switching based and telephony based networks, local area and wide area networks, public and private networks. It will be understood that FIG. 1 is representative of one example of a distributed communication network for supporting chat based communications through chat sessions; other types of network facilitated communications may also be supported and other types of chat based distributed networks may be implemented.

In one embodiment, a server system supporting a chat service, such as server system 102 supporting chat service 104 or enterprise server system 112 supporting chat service 114, facilitates a chat session between at least two client systems enabled by chat clients, such as client systems 106, 110, 116, and 118. It will be understood that additional server systems and client systems may communicatively connect via network 140.

In another embodiment, client systems communicate in a peer-to-peer environment. For example, chat client 108 and chat client 112 may enable a peer-to-peer communicative connection between client system 106 and client system 110.

It will be understood that in addition to a client/server network architecture or peer-to-peer network architecture, other types of network architectures may be implemented for supporting communication between computing systems via network 140.

In the example depicted, client systems 116 and 118 communicatively connect to network 140 via enterprise server system 112. In particular, in one example, in an enterprise system, client systems 116 and 118 communicate via a network behind a firewall controlled by enterprise server system 112; enterprise server system 112 enables communication between client systems 116 and 118 and other systems via network 140. Although not depicted, client systems 116 and 118 may include chat client applications. In addition, chat server 114 facilitates chat communications between client systems 116 and 118 and may also facilitate chat communications between client system 116 and 118 and other client systems, such as client system 106 or client system 108. By facilitating chat communications, chat server 114 may apply security requirements to chat communications and data associated with chat communications.

In the example, chat service 104 or 114 or chat client 108 or 112 include a chat controller that enables chat sessions. In addition, the chat controller enables participants to a chat session to invite other participants and enables current participants in the chat session and invitees to view a mapping of the invitation history for the chat session including, but not limited to, the ordering of invitations, inviter/invitee correspondence, and reasons for inviting each user to join a chat session.

Figure 2:
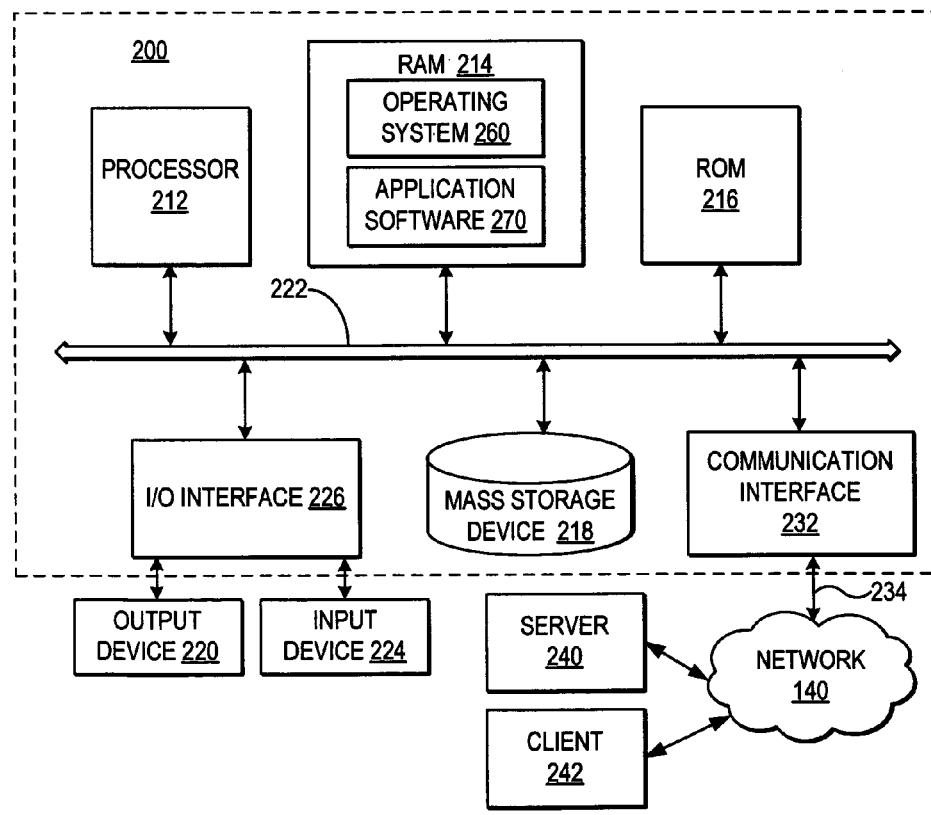
FIG. 2 is a block diagram illustrating a computing system in which the present invention may be implemented.

Referring now to FIG. 2, a block diagram illustrates a computing system in which the present invention may be implemented. The present invention may be executed in a variety of systems, including a variety of computing systems and electronic devices.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as an email server, computer system 200 may include multiple processors designed to improve network servicing power.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. Operating system 260 may provide a graphical user interface (GUI) to the user. In one embodiment, application software 270 may contain machine executable instructions for controlling chat sessions that when executed on processor 212 carry out the operations depicted in the flowcharts and other operations described herein. Alternatively, the steps of the present invention might be performed by specific hardware components that contain hardwired logic for performing the steps, or by any combination of programmed computer components and custom hardware components.

The chat controller of the present invention may be provided as a computer program product, included on a machine-readable medium having stored thereon the machine executable instructions used to program computer system 200 to perform a process according to the present invention. The term "machine-readable medium" as used herein refers to any data storage medium that participates in providing instructions to processor 212 or other components of computer system 200 for execution. Such a data storage medium may take many forms including, but not limited to, non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other data storage medium from which computer system 400 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214.

Moreover, the present invention may be downloaded as a computer program product, wherein the program instructions may be transferred from a remote computer such as a server 240 to requesting computer system 200 via a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 140.

Network link 234 and network 140 both use electrical, electromagnetic, or optical signals that carry digital data streams. The signals through the various networks and the signals on network link 234 and through communication interface 232, which carry the digital data to and from computer system 200, are forms of carrier waves transporting the information.

When implemented as a network server, computer system 200 may include multiple communication interfaces accessible via multiple peripheral component interconnect (PCI) bus bridges connected to an input/output controller. In this manner, computer system 200 allows connections to multiple network computers via multiple separate ports.

In addition, computer system 200 typically includes multiple peripheral components that facilitate communication. These peripheral components are connected to multiple controllers, adapters, and expansion slots, such as input/output (I/O) interface 226, coupled to one of the multiple levels of bus 222. For example, input device 224 may include, for example, a microphone, a keyboard, a mouse, or other input peripheral device, communicatively enabled on bus 222 via I/O interface 226 controlling inputs. In addition, for example, a output device 220 communicatively enabled on bus 222 via I/O interface 226 for controlling outputs may include, for example, one or more graphical display devices, but may also include other output interfaces, such as an audio output interface. In alternate embodiments of the present invention, additional input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
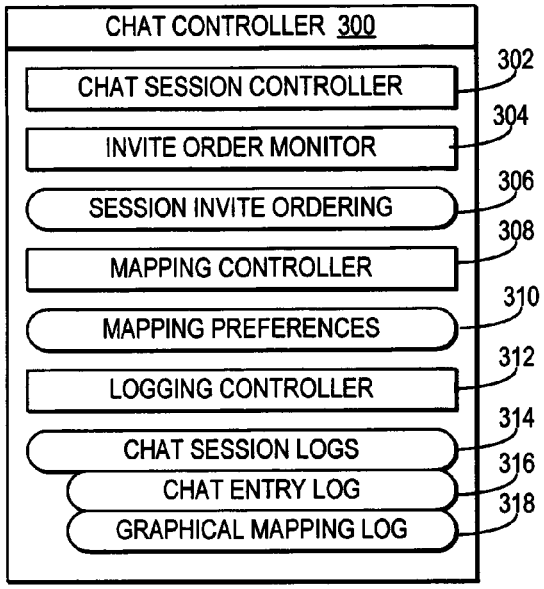
FIG. 3 is a block diagram depicting one embodiment of components of a chat controller.

With reference now to FIG. 3, a block diagram depicts one embodiment of components of a chat controller. As illustrated, in the example, a chat controller 300 includes multiple components. It will be understood additional or alternate components may be implemented by chat controller 300. In addition, it will be understood that chat controller 300 may be distributed across multiple computing systems.

In the example, chat controller 300 includes a chat session controller 302. Chat session controller 302 enables at least one chat session, enables a user starting a chat session to invite multiple participants, and enables current participants to a chat session to invite additional participants. According to an advantage, when a user invites additional participants to a chat session, the user may specify a reason for inviting an additional participant and the invitee may specify a reason for joining a chat session.

In addition, chat session controller 302 may perform other functions associated with enabling chat sessions including, but not limited to, monitoring and distributing user presence indicators. A user presence indicator indicates the availability of a user to participate in a messaging session, the reliability of a device used by the user to participate in a messaging session, and other information indicative of a user's current availability status and future availability status. In one example, chat controller 302 is enabled to detect or receive information about the network connection strength accessible to a computing device used by a chat participant and is also enabled to detect or receive information about estimated network connection strengths based on a GPS detected location of the computing device; using the detected or received information, chat controller 302 can include current device reliability and predicted device reliability in presence indicator. It will be understood that chat presence indicators may also include additional or alternate types of presence information based on the information available to chat session controller 302. In addition, chat session controller 302 may enable text, voice, video and other types of communication transmissions through a chat session.

In addition, in the example, chat controller 300 includes an invite order monitor 304. Invite order monitor 304 detects each invitation to join a chat session and enters a record for the invitation in a session invite ordering storage system 306. As will be further described with reference to FIG. 4, invite order monitor 304 may continue to detect the status of each invitation and update the record for the invitation in session invite ordering storage system 306.

Further, in the example, chat controller 300 includes a mapping controller 308. Mapping controller 308 detects a trigger to map the current entries in session invite ordering data storage system 306 for a particular chat session and generates a graphical mapping of the current entries. In addition, mapping controller 308 may generate a map and dynamically adjust the map responsive to changes in the current entries in session invite ordering data storage system 306 for a particular chat session. Further, if a system does not include invite order monitor 304, then mapping controller 308 may analyze a log of the previous entries in a chat session to infer the invitation history and generate a map of the current invitation history for a chat session.

In one embodiment, mapping controller 308 controls the characteristics of a graphical mapping of current invitation entries for a chat session according to mapping preferences 310. Mapping preferences 310 specifies the mapping preferences for one or more individual users. In one example, a mapping preference may specify preferences for the types of graphical indicators to use in a graphical mapping, the types of tracked information to include in a graphical mapping, and the triggers for automatically generating graphical mappings.

In another example, mapping preferences 310 specifies the mapping preferences for one or more enterprises. For example, where chat controller 300 is implemented by chat service 114 of enterprise server system 112, mapping preferences 310 may specify the mapping preferences for a particular business or other grouping of users enabled by enterprise server system 112. In particular, mapping preferences 310 may specify the security preferences for the types of information that may be graphically mapped and displayed to each user according to security privileges assigned to each user. For example, where a customer and multiple employees communicate in a chat session and the employee network access is regulated by enterprise server system 112, mapping preferences 310 may require that enterprise server system 112 restrict the customer to a view of only a label for each employee and not the employee identity within a graphical mapping but enable the employees to view the other employee identities in a graphical mapping.

In addition, in the example, chat controller 300 includes a logging controller 312. Logging controller 312 controls logging, in chat session logs 314, of the entries of chat sessions and of the dynamically generated mappings of chat session invitation history. In one example, chat session logs 314 include chat entry logs 316 and graphical mapping logs 318. Graphical mapping logs may include a log of the dynamically adjusting graphical invitation mapping of a chat session at different points in time during the chat session. By logging chat session entries and graphical mappings of a chat session, a participant in the chat session or other user may request to review a chat session with the mapping log providing additional graphical context to the reviewer.

Figure 4:
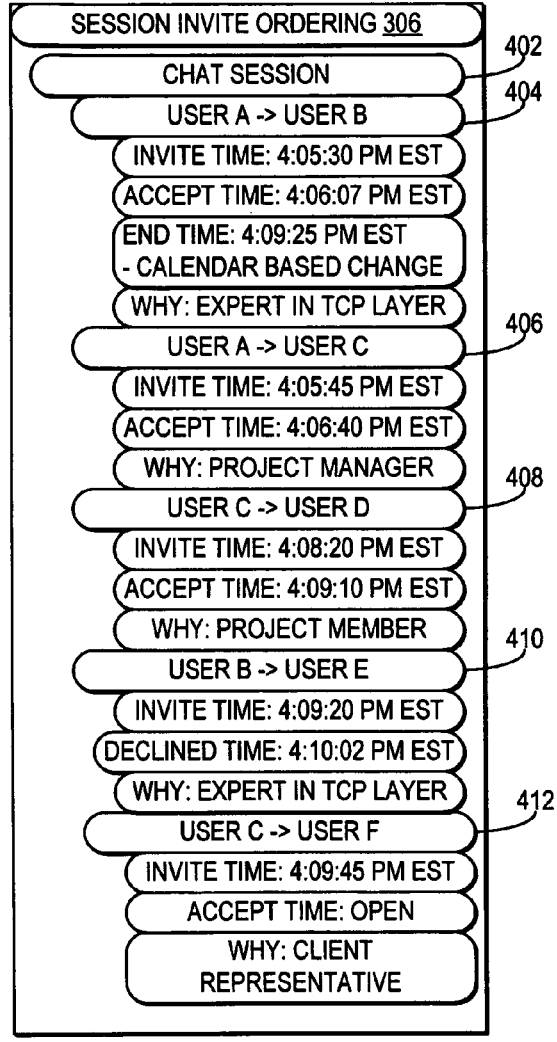
FIG. 4 is an illustrative diagram illustrating an example of a session invite ordering entry.

Referring now to FIG. 4, an illustrative diagram illustrates an example of a session invite ordering entry. As depicted, session invite ordering data storage system 306 may include invitation entries organized by chat session. In the example, invitation entries for a chat session, identified at reference numeral 402, each indicate an inviter to invitee correspondence, the detected invitation initiation time, a response time and a reason for the inclusion of the invitee.

In the example entries, a first entry depicted at reference numeral 404 indicates the inviter as "user A" and the invitee as "user B". The invitee accepted the invitation, as indicated. In addition, a reason stated for "user B" joining the chat session is that "user B" is an "expert in TCP layer". Although not depicted, an entry may further specify whether the inviter, invitee, or controller specified the reasons for the invitation.

In addition, with reference to the entry depicted at reference numeral 404, an indication that "user B" ended participation in the chat session and the time of termination are illustrated. In addition to storing a time of termination, the entry may include a reason for the user ending participation, such as a changed presence indicator selected by the user, by a calendar event, or other controller.

A second entry illustrated at reference numeral 406 indicates the inviter as "user A" and the invitee as "user C". The invitee accepted the invitation, as indicated. In addition, a reason stated for "user C" joining the chat session is that "user C" is the "project manager."

A third entry depicted at reference numeral 408 indicates the inviter as "user C" and the invitee as "user D". The invitee accepted the invitation, as indicated. In addition, a reason stated for "user D" joining the chat session is that "user D" is a "project member."

A fourth entry illustrated at reference numeral 410 indicates the inviter as "user B" and the invitee as "user E". The invitee declined the invitation, as indicated. The reason stated for inviting "user E" to join the chat session is that "user E" is also an "expert in TCP layer." Although not depicted, in addition to recording that "user E" declined the invitation, user E may provide a reason for declining the invitation and the reason may be stored with the invitation entry.

A fifth entry depicted at reference numeral 412 indicates the inviter as "user C" and the invitee as "user F". The invitee has not yet responded to the invitation, as indicated by the status as "open". The reason stated for inviting "user F" to join the chat session is that "user F" the "client representation" for a project being discussed.

It will be understood that additional and alternate types of information may be monitored by invite order monitor 304 and the information stored in entries within session invite ordering data storage system 306.

Figure 5:
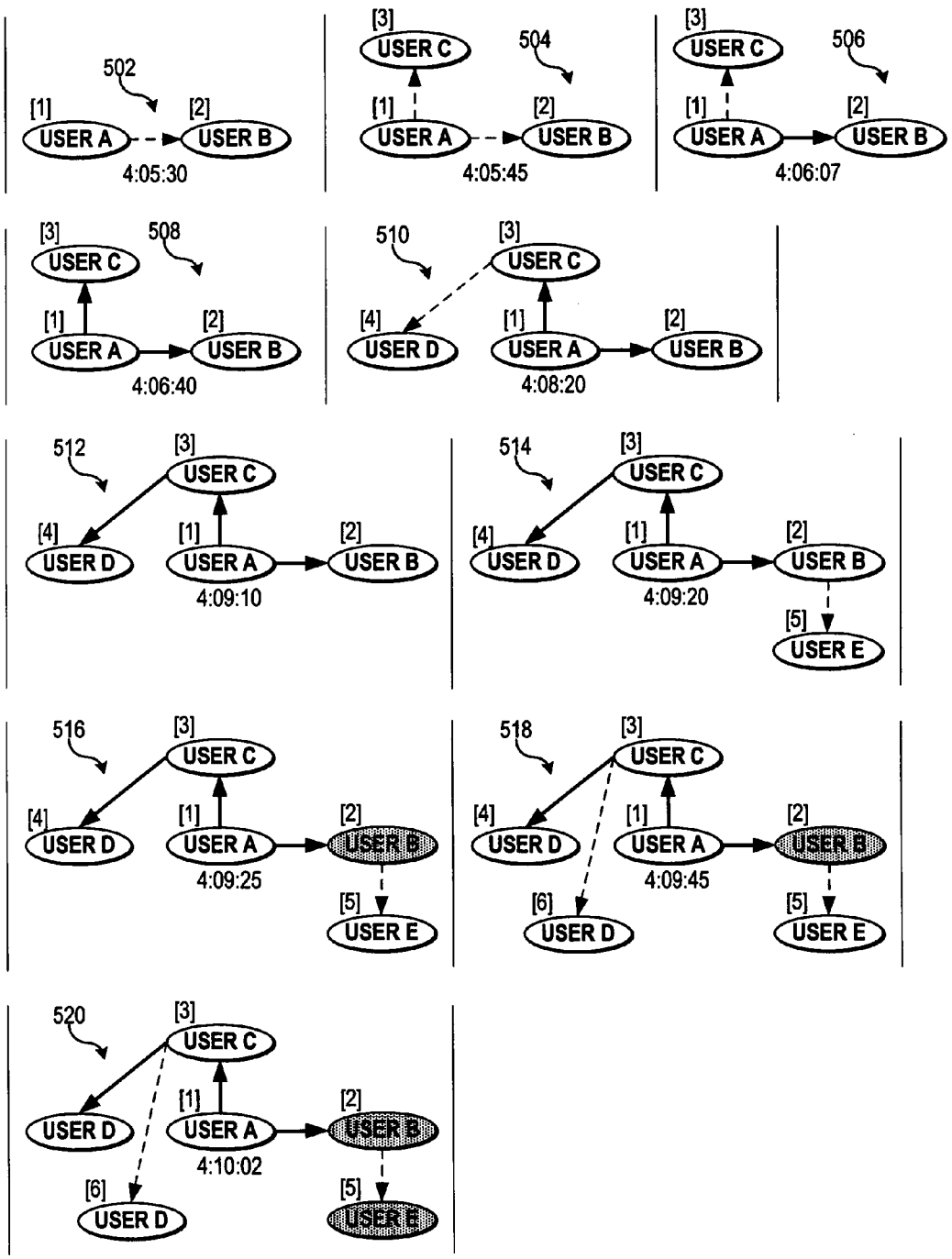
FIG. 5 is a pictorial representation depicting a log of the dynamically generated participant mappings.

With reference now to FIG. 5, a pictorial representation depicts a log of the dynamically generated invitation history mappings, where one or more of the mappings may be displayed responsive to an invitee or participant request to view a current invitation history mapping.

As illustrated, each mapping represents the status of the entries within session invite ordering data storage system 306 for session 402 at new entries are added. It will be understood that additional or alternate information and graphical treatments may be implemented by mapping controller 308 in generating a graphical mapping of an invention history for a chat session.

As depicted at reference numeral 502, a graphical indicator of the invitation from "user A" to "user B" is depicted, with a time stamp indicating the time at which the invitation occurred. In the example, numerals are added to each user graphical indicator to further provide a graphical indicator of the ordering in which invitations occurred. In addition, in the example, an arrow indicates the inviter/invitee correspondence, where the arrow points from the inviter to the invitee. When an invitation is extended, but not yet accepted, for purposes of illustration, the arrow line is dotted. Although a reason for extending the invention is not depicted, reasons for invitation and other information may be displayed within the mapping. In addition, it is important to note that in addition to graphically displaying reasons for invitations and other information statically with each mapping, in another embodiment, the information may be displayed in a pop-up window, transparent overlay, or other layering responsive to the position of a cursor within the graphical mapping display.

As illustrated at reference numeral 504, the graphical mapping is adjusted to reflect that "user A" invited "user C" to participate in the chat session at the time indicated in the time stamp. In the example, because "user C" is a manager, the graphical mapping is adjusted so that "user C" is depicted in a layer above "user A" and "user B" to reflect the managerial position. In particular, mapping controller 308 may consult a listing, mapping, or database to determine hierarchical management rankings of users and to adjust graphical elements to reflect the management relationships. For example, as will be further described, FIG. 9 includes an example of a hierarchical mapping indicating management relationships for "user B".

As depicted at reference numeral 506, the graphical mapping is adjusted to reflect that "user B" accepted the invitation to participate in the chat session at the time indicated in the time stamp. In addition, as illustrated at reference numeral 508, the graphical mapping is adjusted to reflect that "user C" accepted the invention to participate in the chat session at the time indicated in the time stamp.

Next, as depicted at reference numeral 510, the graphical mapping is adjusted to reflect that "user C" invited "user D" to participate in the chat session. As illustrated at reference numeral 512, the graphical mapping is adjusted to reflect that "user D" accepted the invitation.

As illustrated at reference numeral 514, the graphical mapping is adjusted to reflect that "user B" invited "user E" to join in the chat session. Next, as depicted at reference numeral 516, the graphical mapping is adjusted so that the graphical indication of "user B" is shaded to reflect that "user B" has logged out of the messaging session, even though "user E" has not yet responded. In one example, if "user E" selected to view the invitation history mapping at 4:09:22, after receiving the invitation, "user E" would see the invitation history mapping illustrated at reference numeral 514, however, at 4:09:25, the invitation history mapping viewed by "user E" may be dynamically updated to the mapping illustrated at reference numeral 516. It will be understood that additional or alternate graphical indicators may be implemented to represent users who have terminated participation in a chat session or the graphical indication of a user may be removed if the user terminates participation in the chat session.

Next, as depicted at reference numeral 518, the graphical mapping is adjusted to reflect that "user C" invited "user F" to join in the chat session. As illustrated at reference numeral 520, the graphical mapping is updated to indicate that "user E" declined the invitation by shading the graphical indication of "user E".

Figure 6:
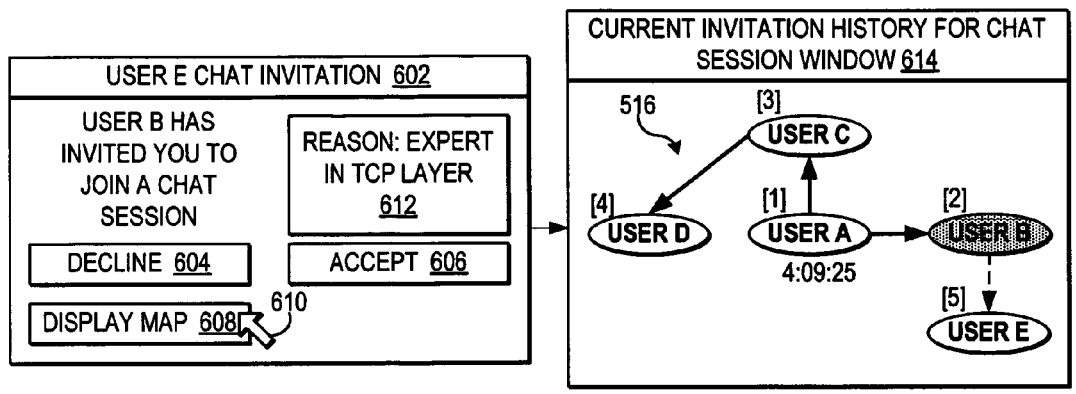
FIG. 6 is a pictorial representation illustrating a chat invitation interface with an option to view a participant mapping.

With reference now to FIG. 6, a pictorial representation depicts a chat invitation interface with an option to view a participant mapping. Within a display interface, a user may receive prompts to join chat sessions. In one example, within the display interface accessible to "user E", a "user E" chat invitation 602 is displayed. As illustrated, invitation 602 includes a message indicating that "user C" has invited "user E" to join a chat session. Although not depicted, the invitation may provide additional information about a chat session, such as a topic or title for the chat session, a listing of the participants of the chat session, or a preview of entries within the chat session.

In the example, invitation 602 includes multiple selectable buttons. In particular, in response to the invitation, "user E" may select to decline the invitation by selecting the button indicated at reference numeral 604 by positioning a cursor 610 in correlation with another entry. In addition, "user E" may select to accept the invitation and join the chat session by selecting the button indicated at reference numeral 606.

In addition, before selecting a response to the invitation, "user E" may select to view a mapping of the invitation history by selecting the button indicated at reference numeral 610. As will be further described, when "user E" selects to view the mapping of the invitation history, "user E" may further specify to select a mapping of the invitation history at the point in time when "user E" selects to view the mapping or "user E" may further specify to select a log of the mapping of the invitation history. With either selection, the graphical mapping is opened within the interface, where the graphical mapping may be represented by one or more of the mappings. In the example, a window 614 includes the current invitation history mapping as of the time the user triggers the window, where the current mapping is illustrated at reference numeral 516. The mapping within window 614 may dynamically update to reflect adjustments to the invitation history for the chat session.

Further, before selecting a response to the invitation, "user E" may select to adjust a reason for joining the session. In particular, as illustrated at reference numeral 612 a reason provided by "user C" for inviting "user E" is displayed, however, "user E" may select to maintain, amend, delete, or replace the reason before selecting a response to the invitation of accepting or declining the invitation. In another embodiment, the option for "user E" to select a reason for joining may be provided within the mapping displayed within window 614.

Figure 7:
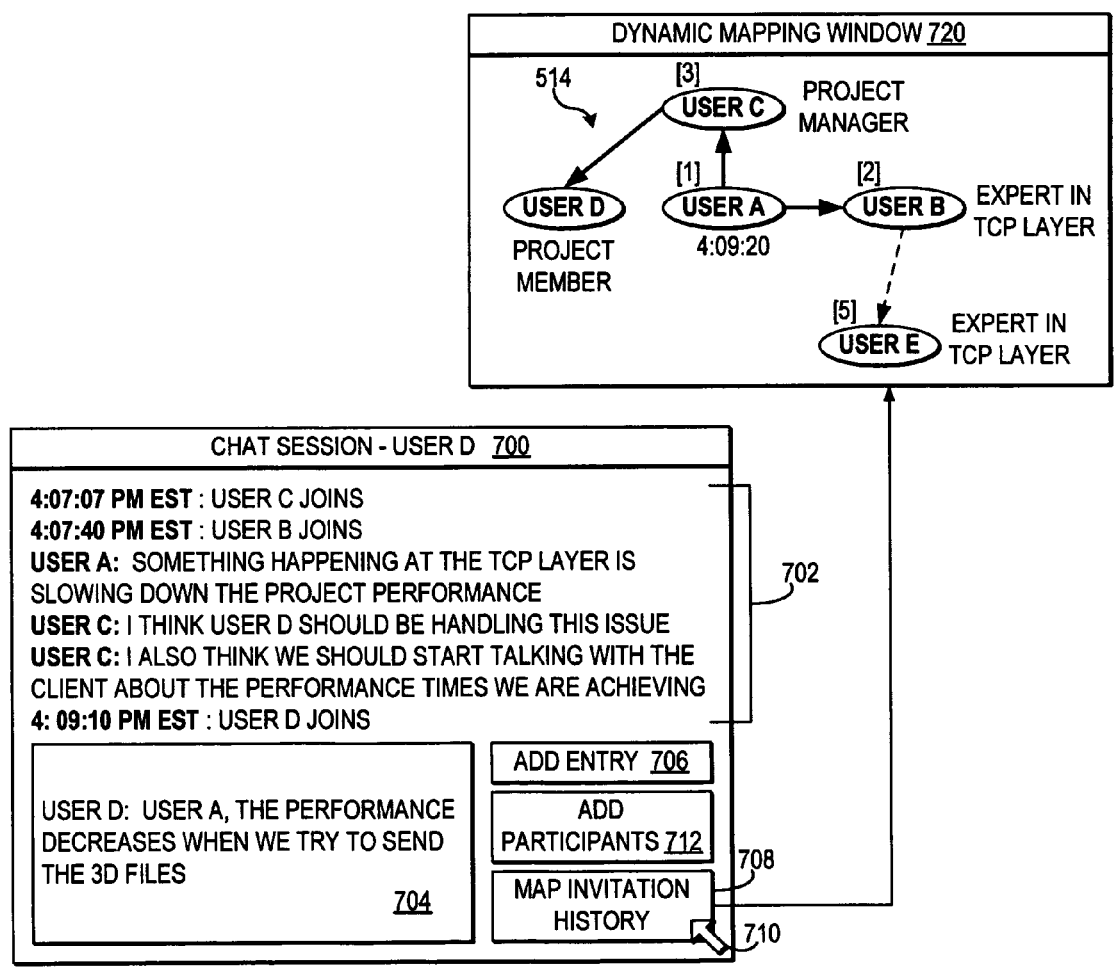
FIG. 7 is a pictorial representation depicting a chat session interface with an option to view a participant mapping.

Referring now to FIG. 7, a pictorial representation illustrates a chat session interface with an option to view a participant mapping. Within a display interface, a user may participate in a chat session. In one example, within the display interface accessible to "user D", an interface for chat session A is depicted, as illustrated at reference numeral 700. It will be understood that multiple chat sessions may be integrated into a single interface. In addition, it will be understood that different types of display and output interfaces may be implemented for enabling a user to view and participate in a chat session.

In the example, the entries of the chat session are depicted at reference numeral 702. In the example, the entries of the chat session include indicators of which different users joined the messaging session, such as the entries marked at "4:07:07 PM EST", "4:07:40 PM EST", and "4:09:10 PM EST". It will be understood that in addition to or as an alternative to including entries indicating when each user joins, entries may include when a user joins, the reason for joining, the inviter/invitee pair, and other information that when added as a chat messaging entry provides invitation history context within the messaging session log.

In addition, the entries of the chat session include text communications entered by "user A" and "user C". It will be understood that in addition to chat communications, additional or alternate communications using voice, video, graphics or other types of communication mediums supported by a chat controller may be implemented.

In the example, a next entry by "user D" is illustrated at reference numeral 704. "User D" may select to add the next entry to the messaging session, for distribution to all the other users participating in the messaging session, by selecting button 706 by positioning cursor 710 over button 706 and entering an input or entering another type of selection input. It will be understood that other entry interfaces may be implemented for enabling a user to add a next entry to a messaging session.

In particular, in the example, the next entry depicted at reference numeral 704 is a response by "user D" to the previous entries in the messaging session, which in the example are provided to "user D" when "user D" joins the messaging session, as illustrated. In an alternate embodiment, when a user joins a messaging session, the user may only receive selections of the previous entries in the messaging session or may not receive any selections of previous entries in the messaging session.

In addition, in the example, a user may select to add additional participants by selecting button 712. In one example, when a user selects to add additional participants, an additional interface is displayed for selection of additional participants, such as the invitee selection interface illustrated at reference numeral 800 in FIG. 8. In the example, a user may select to add additional participants from a selectable buddy list triggered by selection of the button 802. A selectable buddy list may include selectable chat session identifiers specifically added to the buddy list by the user. In addition, in the example, a user may select to add additional participants from a selectable hierarchical mapping triggered by selection of button 804. A selectable hierarchical mapping may include selectable chat session identifiers organized according to management hierarchy within a business or enterprise system. In addition, a hierarchical mapping may be organized to illustrate other types of information, such as illustrating project teams, user office location, and other displayable information. Within the selectable buddy list or selectable hierarchical mapping a current availability status of each user to participate in chat sessions may be indicated with each chat session identifier.

Figure 8:
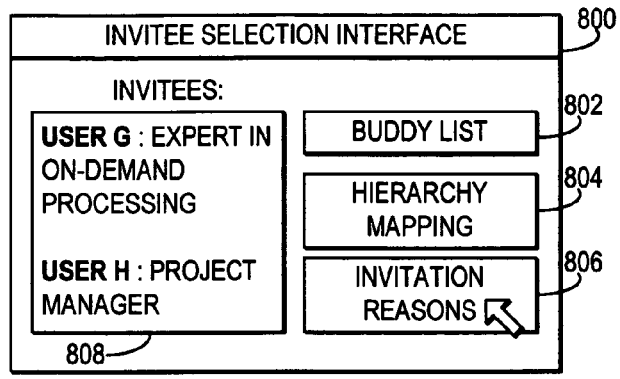
FIG. 8 is a pictorial representation illustrating an interface for selecting additional user to invite to participate in a chat session.

In the example depicted in FIG. 8, as a user selects additional participants from among the selectable buddy list or selectable hierarchical mapping, the chat session identifiers for the additional participants are added to a invitee listing 808. In the example, invitee listing 706 includes "user G" and "user H". A graphical adjustment to each of the chat session identifiers listed in listing 808 may indicate the current availability status of each of the invitees.

In addition, as illustrated with the entries in invitee listing 808, a reason may be specified for each invitation. In one example, the user selecting the invitees may be prompted to select a reason for the invitation or may select to add a reason for invitation. In another example, the user selecting the invitees may select reasons by selecting button 806, which triggers a list of selectable reasons for adding a particular user, type of user, or any user. In another example, a chat session identifier within a selectable buddy list or selectable hierarchical mapping may include additional user specified information that can be selected from or automatically indicates a reason for invitation. For example, if "user H" is selected from a selectable hierarchical mapping, where the mapping for "user H" includes the selectable information of "project manager" and "expert in network attached storage"; in the example, the user selected "project manager" as the reason for the invitation.

Returning to FIG. 7, in addition, in the example, a user may select to map the session participants, by selecting button 708. In one example, "user D" may select to map the session participants, in an invitation history mapping, at the point in time at which the request is triggered. For example, dynamic mapping window 720 illustrates a mapping accessed at the time the request is triggered, which is the mapping available as of 4:09:20 PM EST illustrated at reference numeral 514 in FIG. 5. In the example, "user D" may include a mapping preference for reasons for invitations to be included in the mapping, as illustrated. The mapping within dynamic mapping window 720 may dynamically adjust each time the invitation history tracked in session invite ordering data storage system 306 for a particular chat session changes. For example, the actual mapping displayed within dynamic mapping window 720 may adjust dynamically to reflect the mapping at different times following the trigger time as illustrated in FIG. 5. In another example, a user may select to view a log of the mapped invitation history over time, where the log includes each of the mappings illustrated in FIG. 5 up to the time of the request. In the example, the log would include the mappings at reference numerals 502, 504, 506, 508, 510, 512 and 514.

According to an advantage, in addition to viewing an invitation history within dynamic mapping window 720, a user may select a user indication and request to initiate a chat session with that user. In another example, a user may select a user indication and request a listing of a manager, current project participation, backups, and other organizational and personal information about a user.

Figure 9:
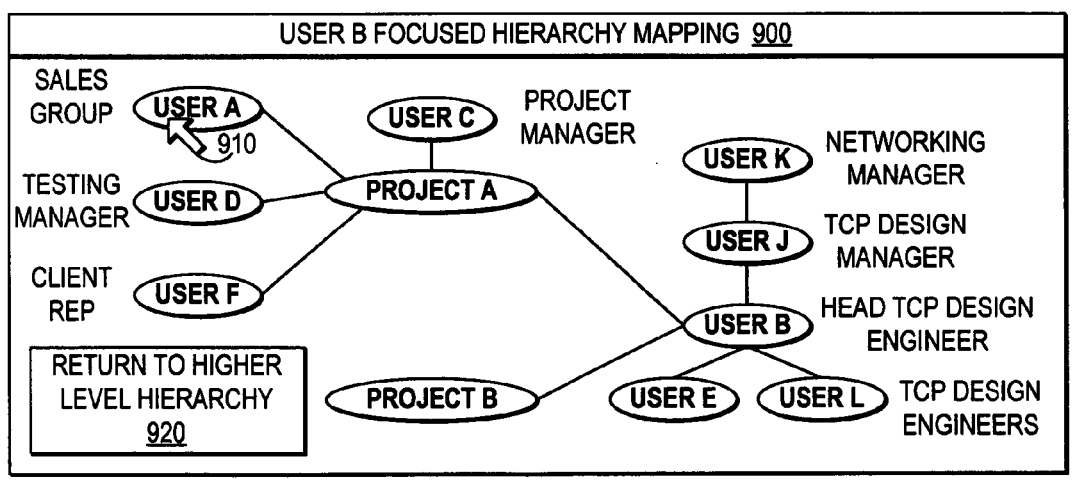
FIG. 9 is a pictorial representation depicting a portion of a hierarchical mapping of users.

In one example, FIG. 9 illustrates a selectable, hierarchy mapping focusing on the connections between "user B" and other participants in the chat session, the current project assignments for "user B" and the other users closely related to "user B" in a management structure. In particular, a user selecting to view a hierarchical mapping from FIG. 8 or triggering a hierarchical mapping by selecting a user indication in mapping window 720, may view a full hierarchical mapping or select from projects, groups, individuals, and other classifications within the hierarchy to narrow the map, such as mapping 900 focused on "user B".

In the example, mapping 900 includes a management structure depicting "user J" as the manager for "user B" and "user K" as the manager for "user J". In addition, in the example, the management structure depicts "user E" and "user L" as managed by "user B". For each user in the management structure, a title is depicted, however, it will be understood that additional information may be provided in identifying each user.

In addition, in the example, mapping 900 includes the project mappings depicting "user B" participating in "project A" and "project B". As to "project A", the roles of the other participants in the chat session depicted throughout the figures shows "user C" as the project manager, "user A" as a member of the sales group, "user D" as a testing manager", and "user F" as the client representation.

In one example, a user may position cursor 910 over a user indication and trigger a pop-up window displaying additional information about the user. For example, positioning cursor 910 over the user indication for "user A" may trigger a pop-up window with information about "user A". In addition, positioning cursor 910 over a particular user indication and entering a selection input may trigger dynamically adjusting the mapping to focus on the selected user or project identifier, for example. Further, through user selection of selectable button 920, a user may select to return to a higher level of the hierarchical mapping. It will be understood that other types of selectable items may be included to enable a user to quickly broaden or narrow hierarchical mapping criteria through graphical selections or query entries.

Figures 10, 11:
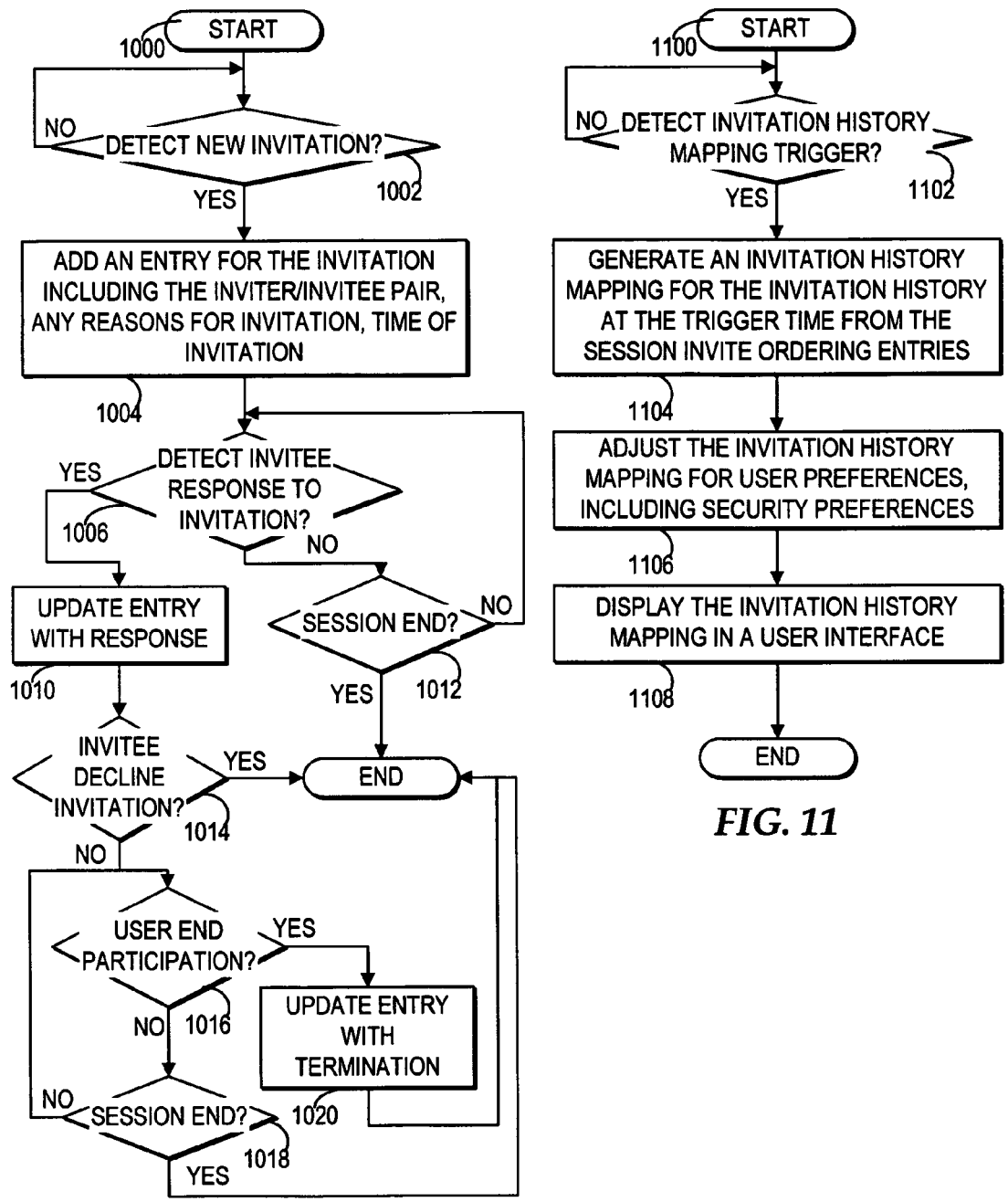
FIG. 10 is a high level logic flowchart illustrating a process and program for maintaining a mappable invitation history.
FIG. 11 is a high level logic flowchart depicting a process and program for responding to a trigger to map the invitation history.

With reference now to FIG. 10, a high level logic flowchart depicts a process and program for maintaining a mappable invitation history. As illustrated, the process starts at block 1000 and thereafter proceeds to block 1002. Block 1002 depicts a determination whether the invite order monitor detects a new invitation for a chat session. If a new invitation is detected, then the process passes to block 1004. Block 1004 illustrates adding an entry for the invitation under the chat session entry in the session invite ordering data storage system, including an inviter/invitee pairing, reasons for the invitation, and time of invitation. In addition, other applicable invitation information may be included in the entry. Next, block 1006 depicts a determination whether invite order monitor detects an invitee response to the invitation. If a response is not detected, then the process passes to block 1012. Block 1012 illustrates a determination whether the chat session has ended. If the chat session has ended, then the process ends. Otherwise, if the chat session has not ended, the process returns to block 1006.

Returning to block 1006, if an invitee response is detected, then the process passes to block 1010. Block 1010 depicts updating the entry for the invitation with the response, including a response time, any reasons for the response and other application response information. Next, block 1014 illustrates a determination whether the invitee declined the invitation, if the invitee declined the invitation, then the process ends. If the invitee did not decline the invitation, then the process passes to block 1016.

Block 1016 depicts a determination whether user participation in the chat session has ended. In one example, when a user's availability status to participate in a chat session changes, the user may specifically terminate participation in the chat session or an automated status detector may change the status and terminate the user's participation in a chat session. If the user participation in a chat session has not ended, then the process passes to block 1018. Block 1018 depicts a determination whether the chat session has ended. If the chat session has ended, then the process ends. If the chat session has not ended, then the process returns to block 1016.

Returning to block 1016, if the user participation in the chat session ends, then the process passes to block 1020. Block 1020 depicts updating the entry for the invitation with the time and any reason for the user leaving the chat session, and the process ends.

Referring now to FIG. 11, a high level logic flowchart depicts a process and program for responding to a trigger to map the invitation history. As depicted, the process starts at block 1100, and thereafter proceeds to block 1102. Block 1102 depicts a determination whether mapping controller 308 detects a trigger for invitation history mapping. If invitation history mapping is triggered, then the process passes to block 1104.

Block 1104 depicts generating an invitation history mapping for the invitation history in the session invite ordering data storage system for the chat session at the time of the trigger. Next, block 1106 illustrates a determination whether the trigger is for display of the invitation history mapping in a user interface. If the trigger is not for display of the invitation history mapping in a user interface, then the process passes to block 1108. Block 1108 depicts logging the invitation history mapping in a mapping log file for the chat session, and the process ends.

Returning to block 1106, if the trigger is for display of the invitation history mapping in a user interface, then the process passes to block 1110. Block 1110 depicts adjusting the mapping for user preferences, including security preferences of a particular user or applied to a user by a chat session controller service. Next, block 1112 illustrates displaying the invitation history mapping in a user interface, and the process passes to block 1108.

While the invention has been particularly shown and described with reference to a preferred embodiment, it will be understood by those skilled in the art that various changes in form and detail may be made therein without departing from the spirit and scope of the invention

What is claimed is:

1. A method for mapping a plurality of invitations to a chat session, comprising:
 a computer controlling a chat service enabling each chat participant accessing a chat session via a separate chat client to invite at least one additional user at least one other chat client to join the chat session through a selectable add participant button within a separate chat session interface for the separate chat client accessible to each chat participant, wherein the selectable add participant button within the chat session interface is separate from a new chat entry interface within the chat session interface for selecting to add new chat entries to the chat session, wherein responsive to a particular chat participant selecting the selectable add participant button within the chat session interface of a particular chat client and selecting the at least one additional user from a display of a plurality of available users, the chat service sends an invitation to the at least one additional user to join the chat session by triggering the at least one other chat client to display a chat invitation interface comprising a selectable accept button for selecting to accept the invitation, a selectable decline button for selecting to decline the invitation, and a selectable display map option for selecting to view a mapping of each of a plurality of invitations sent by the chat service for the chat session;

the computer recording, by an invite order monitor of the chat service, a separate invitation record for each separate invitation of a plurality of invitations to the chat session wherein the plurality of invitations comprise a first invitation from a user starting the chat session to at least one chat participant requesting the at least one chat participant join the chat session and at least one additional invitation by said at least one chat participant inviting the at least one additional user to join in the chat session, wherein the invite order monitor records the separate invitation record for each of the plurality of invitations sent by the chat service for the chat session in an ordering storage system, wherein a logging controller of the chat service separate from the invite order monitor controls logging of a plurality of chat entries by the chat participants who have joined the chat session in a chat session log;

the computer recording, by the invite order monitor with each separate invitation record, a separate invitation time of sending of each separate invitation from among the plurality of invitations;

the computer, responsive to at least one of each chat participant and the at least one additional user responding to at least one particular invitation, recording, by the invite order monitor, in the ordering storage system, a separate response time to the at least one particular invitation and a separate response comprising accepting the at least one particular invitation and declining the at least one particular invitation;

the computer, responsive to at least one of the user, the at least one chat participant, and the at least one additional user selecting a display map option for the chat session through a particular chat client connecting to the chat service, dynamically generating, by the chat service, a mapping of the chat participants and the plurality of invitations recorded in the ordering storage system to graphically represent a sequential ordering of each separate invitation between each invited additional user and each inviting chat participant ordered by each separate invitation time, graphically representing each separate response time and each separate response for the at least one particular invitation, and graphically representing at least one invitation not responded to; and the computer sending the mapping, by the chat service, to the particular chat client for display within a user interface by the particular chat client.

2. The method according to claim 1, wherein the computer dynamically generating a mapping of the chat participants further comprises:

the computer dynamically generating the mapping of the chat participants and the plurality of invitations to graphically represent the sequential ordering of each said separate invitation by graphically displaying a sequential number representing a position of each chat participant in the sequential ordering next to a graphical representation of each chat participant within a mapping window within the user interface separate from a window displaying a plurality of communication entries in the chat session.

3. The method according to claim 1, wherein the computer dynamically generating a mapping of the chat participants further comprises:

the computer, responsive to the particular chat participant sending the invitation from among the plurality of invitations, adding a separate invitation record specifying a first identifier of the particular chat participant, a second identifier for a particular invited additional user, and a particular invitation time of the invitation to join the chat session;

the computer adding a graphical representation to the mapping of a graphical representation of the separate invitation record comprising a separate graphical arrow pointing from a first graphical representation of the first identifier of the particular inviting chat participant to a second graphical representation of the second identifier of the particular invited additional user and a time stamp displayed with each separate graphical arrow displaying the particular invitation time;

the computer, responsive to the particular invited additional user accepting the invitation, updating the recording of the separate invitation record to specify a particular acceptance time of acceptance of the invitation by the particular invited additional user and dynamically adjusting the graphical representation of the separate invitation record to display the particular acceptance time; the computer, responsive to the particular invited additional user declining the invitation from among the plurality of invitations, updating the recording of the separate invitation record to specify a particular decline time of decline of the invitation by the particular invited additional user and dynamically adjusting the graphical representation of the separate invitation record to display the particular decline time.

4. The method according to claim 3, wherein the computer dynamically generating a mapping of the chat participants further comprises: the computer graphically representing in the mapping each graphical representation of each chat participant positioned to reflect a separate business hierarchy level assigned for each of the chat participants from among a plurality of hierarchical ranking levels in relation to each of the other chat participants.

5. The method according to claim 3, wherein the computer dynamically generating a mapping of the chat participants further comprises: the computer graphically representing the separate graphical arrow displayed with a dotted line if the particular acceptance time in the separate entry is not set; and the computer graphically representing the separate graphical arrow displayed with a solid line if the particular acceptance time in the separate entry is recorded.

6. The method according to claim 1, further comprising: the computer, responsive to detecting the particular chat participant leave the chat session, recording, by the invite order monitor, in the ordering storage system, a separate leave time when the particular chat participant left the chat session; the computer dynamically adjusting the mapping to reflect the particular chat participant leaving, wherein if the particular chat participant sends an invitation for the at least one other user and leaves the chat session before the at least one other user responds to the invitation, the mapping viewed by the at least one other user shows the particular chat participant has left the chat session.

7. The method according to claim 3, wherein the computer displaying the mapping within a user interface further comprises: the computer displaying a selectable buddy list interface within the user interface comprising a plurality of users selectable by the particular inviting chat participant to send the particular invitation and a selectable option for the particular inviting chat participant to select the particular reason for the particular invitation; and the computer, responsive to the particular inviting chat participant selecting the second selectable option to select the particular reason, triggering display of a selectable list of a plurality of reasons comprising an expert, a manager, and a project member.

8. The method according to claim 1, further comprising: the computer adjusting the mapping according to at least one user preference specifying at least one from among a graphical treatment preference and a data security preference.

9. The method according to claim 1, further comprising: the computer, for each separate generation of the mapping, logging each separate generation of the mapping in the chat session log file.

10. A system for mapping the invitations to a chat session, comprising: at least one computing system operative on at least one processor and operative to facilitate a chat service enabling each chat participant accessing a chat session via a separate chat client to invite at least one additional user at least one other chat client to join in the chat session through a selectable add participant button within a separate chat session interface for the separate chat client accessible to each chat participant, wherein the selectable add participant button within the chat session interface is separate from a new chat entry interface within the chat session interface for selecting to add new chat entries to the chat session, wherein responsive to a particular chat participant selecting the selectable add participant button within the chat session interface of a particular chat client and selecting the at least one additional user from a display of a plurality of available users, the chat service sends an invitation to the at least one additional user to join the chat session by triggering the at least one other chat client to display a chat invitation interface comprising a selectable accept button for selecting to accept the invitation, a selectable decline button for selecting to decline the invitation, and a selectable display map option for selecting to view a mapping of each of a plurality of invitations sent by the chat service for the chat session;

the at least one computing system operative to record, by an invite order monitor, a separate invitation record for each separate invitation of a plurality of invitations to the chat session wherein the plurality of invitations comprise a first invitation from a user starting the chat session to at least one chat participant requesting the at least one chat participant join the chat session and at least one additional invitation by said at least one chat participant inviting the at least one additional user to join in the chat session, wherein the invite order monitor records the separate invitation record for each of the plurality of invitations sent by the chat service for the chat session in an ordering storage system, wherein a logging controller of the chat service separate from the invite order monitor controls logging of a plurality of chat entries by the chat participants who have joined the chat session in a chat session log;

the at least one computing system operative to record, by the invite order monitor with each separate invitation record, a separate invitation time of sending of each separate invitation from among the plurality of invitations;

the at least one computing system, responsive to at least one of each chat participant and the at least one additional user responding to at least one particular invitation, operative to record, by the invite order monitor, in the ordering storage system, a separate response time to the at least one particular invitation and a separate response comprising accepting the at least one particular invitation and declining the at least one particular invitation;

the at least one computing system, responsive to at least one of the user, the at least one chat participant, and the at least one additional user selecting a display map option for the chat session through a particular chat client connecting to the chat service, operative to dynamically generate a mapping of the chat participants and the plurality of invitations recorded in the ordering storage system to graphically represent a sequential ordering of each separate invitation between each invited additional user and each inviting chat participant ordered by each separate invitation time, graphically representing each separate response time and each separate response for the at least one particular invitation, and graphically representing at least one invitation not responded to; and the at least one computing system operative to send the mapping, by the chat service, to the particular chat client for display within a user interface by the particular chat client.

11. The system according to claim 10, the at least one computing system further operative to dynamically generate the mapping of the chat participants and the plurality of invitations to graphically represent the sequential ordering of each said separate invitation by graphically displaying a sequential number representing a position of each chat participant in the sequential ordering next to a graphical representation of each chat participant within a mapping window within the user interface separate from a window displaying a plurality of communication entries in the chat session.

12. The system according to claim 10, the at least one computing system further operative to:

responsive to the particular chat participant sending the invitation from among the plurality of invitations, add a separate invitation record specifying a first identifier of the particular chat participant, a second identifier for a particular invited additional user, and a particular invitation time of the invitation to join the chat session;

add a graphical representation to the mapping of a graphical representation of the separate invitation record comprising a separate graphical arrow pointing from a first graphical representation of the first identifier of the particular inviting chat participant to a second graphical representation of the second identifier of the particular invited additional user and a time stamp displayed with each separate graphical arrow displaying the particular invitation time;

responsive to the particular invited additional user accepting the particular invitation update the recording of the separate invitation record to specify a particular acceptance time of acceptance of the invitation by the particular invited additional user and dynamically adjust the graphical representation of the separate invitation record to display the particular acceptance time;

responsive to the particular invited additional user declining the invitation from among the plurality of invitations, update the recording of the separate invitation record to specify a particular decline time of decline of the invitation by the particular invited additional user and dynamically adjust the graphical representation of the separate invitation record to display the particular decline time.

13. The system according to claim 12, the at least one computing system further operative to graphically represent in the mapping each graphical representation of each chat participant positioned to reflect a separate business hierarchy level assigned for each of the chat participants from among a plurality of hierarchical ranking levels in relation to each of the other chat participants.

14. The system according to claim 12, the at least one computing system further operative to:
graphically represent the separate graphical arrow displayed with a dotted line if the particular acceptance time in the separate entry is not set; and
graphically represent the separate graphical arrow displayed with a solid line if the particular acceptance time in the separate entry is recorded.

15. The system according to claim 10, further comprising:
the at least one computing system operative, responsive to detecting the particular chat participant leave the chat session, to record, by the invite order monitor, in the ordering storage system, a separate leave time when the particular chat participant left the chat session;
the at least one computer system operative to dynamically adjust the mapping to reflect the particular chat participant leaving, wherein if the particular chat participant sends an invitation for the at least one other user and leaves the chat session before the at least one other user responds to the invitation, the mapping viewed by the at least one other user shows the particular chat participant has left the chat session.

16. The system according to claim 12, the at least one computing system further operative to:
display a selectable buddy list interface within the user interface comprising a plurality of users selectable by the particular inviting chat participant to send the particular invitation and a selectable option for the particular inviting chat participant to select the particular reason for the particular invitation; and
responsive to the particular inviting chat participant selecting the second selectable option to select the particular reason, to trigger display of a selectable list of a plurality of reasons comprising an expert, a manager, and a project member.

17. The system according to claim 10, said at least one computing system further operative to log each separate generation of the mapping in the chat session log file.

18. A computer program product for mapping the invitations to the chat session, the computer program product comprising
one or more computer-readable, tangible storage devices;
program instructions, stored on at least one of the one or more storage devices, to control facilitating a chat service enabling each chat participant accessing a chat session via a separate chat client to invite at least one additional user at least one other chat client to join the chat session through a selectable add participant button within a separate chat session interface for the separate chat client accessible to each chat participant, wherein the selectable add participant button within the chat session interface is separate from a new chat entry interface within the chat session interface for selecting to add new chat entries to the chat session, wherein responsive to a particular chat participant selecting the selectable add participant button within the chat session interface of a particular chat client and selecting the at least one additional user from a display of a plurality of available users, the chat service sends an invitation to the at least one additional user to join the chat session by triggering the at least one other chat client to display a chat invitation interface comprising a selectable accept button for selecting to accept the invitation, a selectable decline button for selecting to decline the invitation, and a selectable display map option for selecting to view a mapping of each of a plurality of invitations sent by the chat service for the chat session;
program instructions, stored on at least one of the one or more storage devices, to control recording, by an invite order monitor of the chat service, a separate invitation record for each separate invitation of a plurality of invitations to the chat session wherein the plurality of invitations comprise a first invitation from a user starting the chat session to at least one chat participant requesting the at least one chat participant join the chat session and at least one additional invitation by said at least one chat participant inviting the at least one additional user to join in the chat session, wherein the invite order monitor records the separate invitation record for each of the plurality of invitations sent by the chat service for the chat session in an ordering storage system, wherein a logging controller of the chat service separate from the invite order monitor controls logging of a plurality of chat entries by the chat participants who have joined the chat session in a chat session log;
program instructions, stored on at least one of the one or more storage devices, to control recording, by the invite order monitor with each separate invitation record, of a separate invitation time of sending of each separate invitation from among the plurality of invitations;
program instructions, stored on at least one of the one or more storage devices, to control, responsive to at least one of each chat participant and the at least one additional user responding to at least one particular invitation, recording, by the invite order monitor, in the ordering storage system, a separate response time to the at least one particular invitation and a separate response comprising accepting the at least one particular invitation and declining the at least one particular invitation;
program instructions, stored on at least one of the one or more storage devices, to control, responsive to at least one of the user, the at least one chat participant, and the at least one additional user selecting a display map option for the chat session through a particular chat client connecting to the chat service, dynamically generation, by the chat service, of a mapping of the chat participants and the plurality of invitations recorded in the ordering storage system to graphically represent a sequential ordering of each separate invitation between each invited additional user and each inviting chat participant ordered by each separate invitation time, graphically representing each separate response time and each separate response for the at least one particular invitation, and graphically representing at least one invitation not responded to;
program instructions, stored on at least one of the one or more storage devices, to control sending the mapping, by the chat service, to the particular chat client for display within a user interface by the particular chat client.

* * * * *